(12) United States Patent
Feng et al.

(10) Patent No.: US 8,248,034 B2
(45) Date of Patent: Aug. 21, 2012

(54) DRY CELL BATTERY DISCHARGING SYSTEM

(75) Inventors: Lan-Yi Feng, Shenzhen (CN); Ting Ge, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 296 days.

(21) Appl. No.: 12/780,959

(22) Filed: May 17, 2010

(65) Prior Publication Data

US 2011/0234163 A1 Sep. 29, 2011

(30) Foreign Application Priority Data

Mar. 29, 2010 (CN) .......................... 2010 1 0135026

(51) Int. Cl.
*H01M 10/46* (2006.01)
(52) U.S. Cl. ...................................................... 320/135
(58) Field of Classification Search .................. 320/100, 320/103, 107, 112, 116, 118, 120, 122, 127, 320/132, 135, 149
See application file for complete search history.

(56) References Cited

U.S. PATENT DOCUMENTS

| | | | |
|---|---|---|---|
| 2005/0017687 A1* | 1/2005 | Nagaoka | 320/132 |
| 2006/0028179 A1* | 2/2006 | Yudahira et al. | 320/133 |
| 2007/0216366 A1* | 9/2007 | Inamine et al. | 320/132 |

* cited by examiner

*Primary Examiner* — Edward Tso
(74) *Attorney, Agent, or Firm* — Altis Law Group, Inc.

(57) ABSTRACT

Used dry cell batteries having a terminal voltage less than a working voltage of a previously applied device but higher than an exhaustion voltage below which the dry cell batteries stop discharging can be used in a present provided discharging system. The used dry cell batteries are connected in series. The discharging system also includes a discharging unit, a measuring unit, a judging unit, and an indicating unit. The discharging unit discharges the used dry cell batteries. The measuring unit measures the terminal voltage of each dry cell battery. The judging unit judges if the terminal voltage of each dry cell battery is less than a preset voltage below which the dry cell battery is deemed to be exhausted. The indicating unit indicates which dry cell battery has the terminal voltage less than the preset value for replacement.

11 Claims, 1 Drawing Sheet

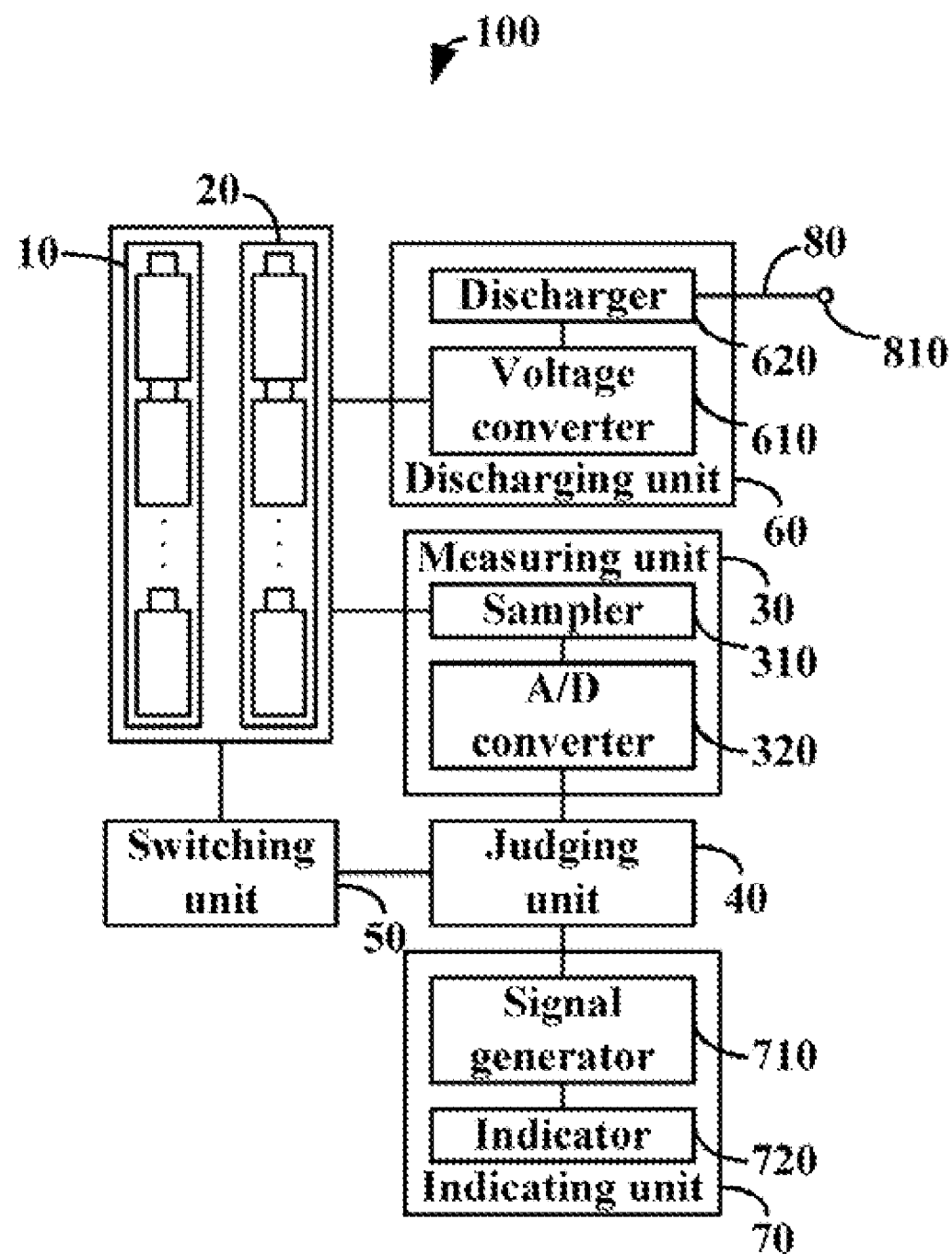

DRY CELL BATTERY DISCHARGING SYSTEM

BACKGROUND

1. Technical Field

The present disclosure relates to a discharging system for increasing discharging efficiency of dry cell batteries.

2. Description of Related Art

Generally, a terminal voltage of a dry cell battery gradually decreases as the dry cell battery is being used, discharging continues over use until the dry cell battery stops discharging when the terminal voltage gets close to an exhaustion value, e.g., 0.9V. However, most devices require a working voltage higher than that exhaustion voltage. For example, the working voltage of toy cars is typically higher than 1.1V. As such, many dry cell batteries may be discarded before completely exhausted.

Therefore, it is desirable to provide a dry cell battery discharging system, which can overcome the above-mentioned limitations.

BRIEF DESCRIPTION OF THE DRAWING

Many aspects of the present discharging system should be better understood with reference to the following drawing. The components in the drawing are not necessarily drawn to scale, the emphasis instead being placed upon clearly illustrating the principles of the present discharging system The drawing is a block diagram of a dry cell battery discharging system, according to an embodiment.

DETAILED DESCRIPTION

Embodiments of the present discharging system will now be described in detail with reference to the drawing.

Referring to the drawing, a discharging system 100, according to an embodiment, includes a first dry cell battery arrangement 10, a second dry cell battery arrangement 20, a measuring unit 30, a judging unit 40, a switching unit 50, a discharging unit 60, an indicating unit 70, and an output cable 80.

The dry cell battery arrangements 10 and 20 can be selectively connected to the discharging unit 60 and can be discharged for use as a power supply via the discharging unit 60 (see below). Each of the dry cell battery arrangements 10 and 20 includes a number of dry cell batteries 111, which are connected in series. The dry cell batteries 111 can be brand-new or used. However, to increase efficiency of the discharging system 100, in this embodiment, the dry cell batteries 111 are used batteries. As such, a brand-new battery can be first used for directly and conveniently supplying power for a device (not shown) such as a toy car, and then used in the discharging system 100 after the terminal voltage gets below the working voltage of the device, e.g., 1.1V, but above an exhaustion voltage, e.g., 0.9V, below which the battery may stop discharging.

The measuring unit 30 is configured for measuring the terminal voltage of each dry cell battery 111. In this embodiment, the measuring unit 30 includes a sampler 310 and an analog-to-digital (A/D) converter 320. The sampler 310 is configured for sampling the terminal voltage of each dry cell battery 111. The A/D converter 320 is configured for converting the sampled terminal voltage of each dry cell battery 111 into digital data.

The judging unit 40 is configured for receiving the digital data and judging if the terminal voltage of each dry cell battery 111 is higher than a preset value below which the dry cell battery 111 is deemed to be exhausted, according to the received digital data. The preset value can be equal to or slightly higher than the exhaustion voltage, such as 0.9V or 1.0V.

The switching unit 50 is configured for switching off a connection between a current discharging dry cell battery arrangement 10/20 and the discharging unit 60, if any dry cell battery 111 of the current discharging dry cell battery arrangement 10/20 has a terminal voltage less than the preset value, as judged by the judging unit 40, and switching on a connection between the other dry cell battery arrangement 20/10 and the discharging unit 60. As such, the discharging system 100 can discharge via the discharging unit 60 continuously even when some dry cell batteries 111 in one selectable dry cell battery arrangement 10 or 20 are exhausted.

The discharging unit 60 is configured for discharging the dry cell battery arrangement 10 or 20 being connected thereto and outputting power for an external device (not shown) via the output cable 80. The discharging unit 60 includes a voltage converter 610 and a discharger 620. The voltage converter 610 is configured for converting the total output voltage of the current discharging dry cell battery arrangement 10 or 20 into a rated voltage of the device. The discharger 620 is configured for supplying power for the device via the output cable. Alternatively, the discharger 620 also can be connected to a charging system for charging a rechargeable battery. The output cable 80 can be a universal series bus (USB) cable with a USB plug 810 for connecting the device.

The indicating unit 70 is configured for indicating which dry cell battery 111 is exhausted, as judged by the judging unit 40. As such, users can replace the exhausted dry cell battery 111. In this embodiment, the indicating unit 70 includes a signal generator 710 and an indicator 720. The signal generator 710 is configured for generating a driving signal representing which dry cell battery 111 is exhausted based upon the judgment of the judging unit 40. The indicator 720 is configured for receiving the driving signal and is driven to indicate which dry cell battery 111 is exhausted by the driving signal. In particular, the indicator 720 can be a light emitting diode (LED) array (not shown) corresponding the dry cell battery arrangements 10 and 20. Each LED corresponds to a dry cell battery 111 and will be driven to light when the corresponding dry cell battery 111 is exhausted.

It is noteworthy that only one dry cell battery arrangement can be employed in another embodiment and accordingly the switching unit can be omitted in such the embodiment. Also, more than two dry cell battery arrangements can be employed too and another switching unit can be employed instead for switching the battery arrangements to discharge.

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A discharging system comprising:
 a dry cell battery arrangement comprising one or more dry cell batteries connected in series;
 a discharging unit connected to the dry cell battery arrangement for discharging the one or more dry cell batteries to supply power;
 a measuring unit configured for measuring a terminal voltage of each dry cell battery;

a judging unit configured for judging if the terminal voltage of each dry cell battery higher than a preset value; and an indicating unit configured for indicating which dry cell battery requires replacement based upon the judgment of the judging unit.

2. The discharging system of claim 1, wherein the one or more dry cell batteries are used batteries.

3. The discharging system of claim 1, wherein the discharging unit comprises a voltage converter; the voltage converter being configured for converting an output voltage of the dry cell battery arrangement into a rated voltage of a device to which the discharging unit supplies power.

4. The discharging system of claim 1, wherein the discharging unit comprises a discharger configured for supply power for a device.

5. The discharging system of claim 1, further comprising an output cable, the output cable connecting the discharging unit to a device for power supply.

6. The discharging system of claim 5, wherein the output cable is a universal series bus cable.

7. The discharging system of claim 1, wherein the measuring unit comprises a sampler and an analog-to-digital converter; the sampler being configured for sampling the terminal voltage of each dry cell battery; the analog-to-digital converter being configured for converting the terminal voltage of each dry cell battery into digital data.

8. The discharging system of claim 1, wherein the preset value is higher than an exhaustion voltage below which the dry cell battery stops discharging.

9. The discharging system of claim 1, wherein the indicating unit comprises a signal generator and an indicator; the signal generator being configured for generating a driving signal based upon the judgment of the judging unit; the indicator being driven to indicate which dry cell battery has a terminal voltage less than the preset value for replacement by the driving signal.

10. The discharging system of claim 1, further comprising another dry cell battery arrangement and a switching unit; the dry cell battery arrangements being selectively connected to the discharging unit by the switching unit, according the judgment of the judging unit.

11. The discharging system of claim 10, wherein the switching unit is configured for switching off a connection between a current discharging dry cell battery arrangement if any dry cell battery of the current discharging dry cell battery arrangement has a terminal voltage less than the preset value and switching on a connection between the other dry cell battery arrangement and the discharging unit.

* * * * *